US009600731B2

United States Patent
Yasunaga et al.

(10) Patent No.: US 9,600,731 B2
(45) Date of Patent: Mar. 21, 2017

(54) IMAGE PROCESSING APPARATUS, IMAGE PROCESSING METHOD AND COMPUTER-READABLE STORAGE MEDIUM

(71) Applicant: TOSHIBA TEC KABUSHIKI KAISHA, Tokyo (JP)

(72) Inventors: Masaaki Yasunaga, Sunto Shizuoka (JP); Kazuki Taira, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/681,899

(22) Filed: Apr. 8, 2015

(65) Prior Publication Data

US 2016/0300115 A1    Oct. 13, 2016

(51) Int. Cl.
*G06K 9/00* (2006.01)
*G06K 9/18* (2006.01)
*G06K 9/32* (2006.01)
*G06K 9/62* (2006.01)
*G06K 9/46* (2006.01)

(52) U.S. Cl.
CPC .............. *G06K 9/18* (2013.01); *G06K 9/325* (2013.01); *G06K 9/4604* (2013.01); *G06K 9/6202* (2013.01); *G06K 9/6292* (2013.01); *G06K 2209/01* (2013.01)

(58) Field of Classification Search
CPC ....... G06K 9/18; G06K 9/4604; G06K 9/6215
USPC .......................... 382/180, 181, 182, 190, 225
See application file for complete search history.

(56) References Cited

U.S. PATENT DOCUMENTS

| 6,014,460 | A  | * | 1/2000  | Fukushima | G06K 9/72    |
|           |    |   |         |           | 382/177      |
| 7,680,329 | B2 | * | 3/2010  | Akagi     | G06K 9/342   |
|           |    |   |         |           | 382/178      |
| 7,844,115 | B2 | * | 11/2010 | Ohwa      | G06F 17/30265|
|           |    |   |         |           | 382/190      |
| 8,457,407 | B2 | * | 6/2013  | Wada      | G06F 17/30274|
|           |    |   |         |           | 382/182      |

(Continued)

FOREIGN PATENT DOCUMENTS

JP           2013-206175         10/2013

OTHER PUBLICATIONS

Computer English Translation of Japanese Patent No. 2013-206175A, pp. 1-13.*

*Primary Examiner* — Daniel Mariam
(74) *Attorney, Agent, or Firm* — Patterson & Sheridan, LLP

(57) ABSTRACT

According to one embodiment, an image processing apparatus includes a calculation unit. The calculation unit is configured to calculate a first similarity degree group which is composed of similarity degrees between respective characters constituting a first character string appearing on a first image and respective candidate characters in a candidate character group, to calculate a second similarity degree group which is composed of similarity degrees between respective characters constituting a second character string appearing on a second image and the respective candidate characters, and to calculate a third similarity degree group which is composed of similarity degrees between respective characters constituting a third character string appearing on the second image and the respective candidate characters.

9 Claims, 3 Drawing Sheets

(56) References Cited

U.S. PATENT DOCUMENTS

2008/0063280 A1* 3/2008 Hofman ............. G06K 9/00973
382/182

* cited by examiner

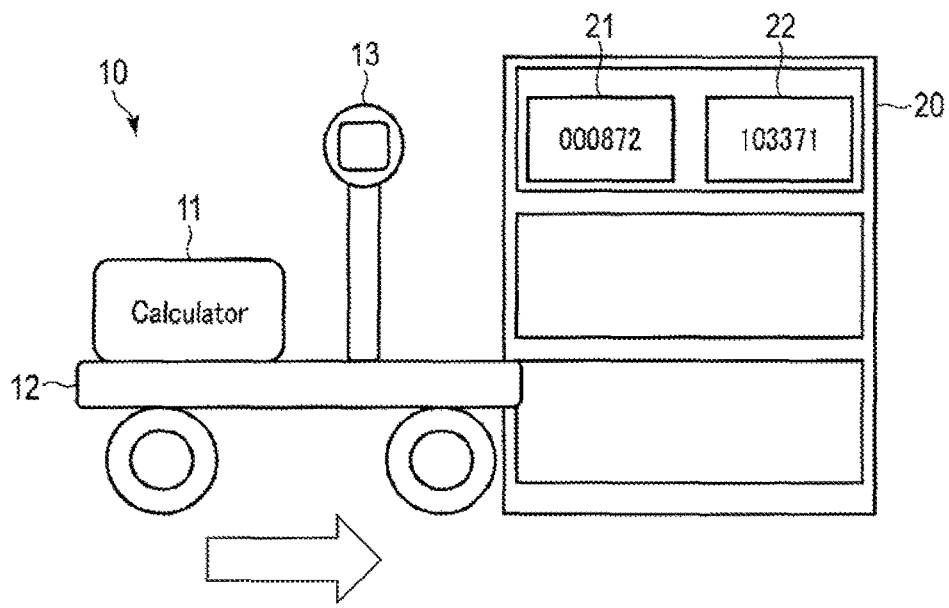
F I G. 1
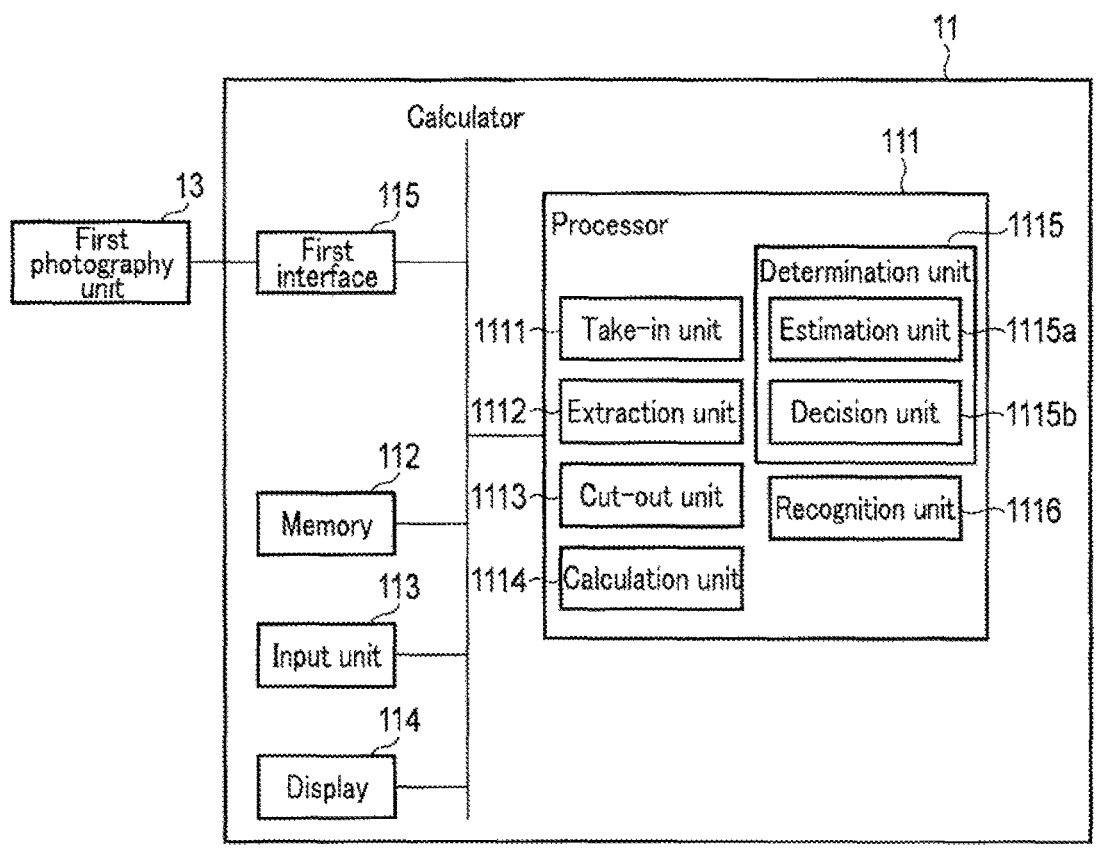
F I G. 2

<First image: character string a1>

| | 6th digit | 5th digit | 4th digit | 3rd digit | 2nd digit | 1st digit |
|---|---|---|---|---|---|---|
| 0 | 0.9 | 0.8 | 0.5 | 0.0 | 0.0 | 0.0 |
| 1 | 0.0 | 0.0 | 0.0 | 0.0 | 0.1 | 0.0 |
| 2 | 0.0 | 0.0 | 0.0 | 0.0 | 0.0 | 0.6 |
| 3 | 0.0 | 0.0 | 0.0 | 0.1 | 0.0 | 0.0 |
| 4 | 0.1 | 0.0 | 0.0 | 0.0 | 0.0 | 0.0 |
| 5 | 0.0 | 0.0 | 0.0 | 0.0 | 0.0 | 0.4 |
| 6 | 0.0 | 0.0 | 0.2 | 0.0 | 0.0 | 0.1 |
| 7 | 0.0 | 0.0 | 0.0 | 0.0 | 0.8 | 0.0 |
| 8 | 0.1 | 0.1 | 0.2 | 0.6 | 0.0 | 0.0 |
| 9 | 0.0 | 0.1 | 0.2 | 0.3 | 0.2 | 0.0 |

Recognition result
000872

<Second image: character string a2>

| | 6th digit | 5th digit | 4th digit | 3rd digit | 2nd digit | 1st digit |
|---|---|---|---|---|---|---|
| 0 | 0.8 | 0.9 | 0.4 | 0.0 | 0.0 | 0.0 |
| 1 | 0.0 | 0.0 | 0.0 | 0.0 | 0.2 | 0.0 |
| 2 | 0.0 | 0.0 | 0.0 | 0.0 | 0.0 | 0.7 |
| 3 | 0.0 | 0.0 | 0.1 | 0.1 | 0.0 | 0.0 |
| 4 | 0.1 | 0.0 | 0.0 | 0.0 | 0.0 | 0.0 |
| 5 | 0.0 | 0.0 | 0.0 | 0.0 | 0.0 | 0.3 |
| 6 | 0.1 | 0.0 | 0.2 | 0.1 | 0.0 | 0.2 |
| 7 | 0.0 | 0.0 | 0.0 | 0.0 | 0.9 | 0.0 |
| 8 | 0.2 | 0.2 | 0.5 | 0.5 | 0.0 | 0.0 |
| 9 | 0.0 | 0.1 | 0.1 | 0.3 | 0.1 | 0.0 |

Recognition result
008872

<First image: character string b1>

| | 6th digit | 5th digit | 4th digit | 3rd digit | 2nd digit | 1st digit |
|---|---|---|---|---|---|---|
| 0 | 0.0 | 0.8 | 0.0 | 0.0 | 0.0 | 0.0 |
| 1 | 0.8 | 0.0 | 0.0 | 0.0 | 0.2 | 0.8 |
| 2 | 0.0 | 0.0 | 0.0 | 0.0 | 0.0 | 0.0 |
| 3 | 0.0 | 0.0 | 0.6 | 0.8 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.2 | 0.0 | 0.1 | 0.0 | 0.0 | 0.0 |
| 7 | 0.2 | 0.0 | 0.0 | 0.0 | 0.8 | 0.2 |
| 8 | 0.0 | 0.3 | 0.3 | 0.2 | 0.0 | 0.1 |
| 9 | 0.0 | 0.1 | 0.0 | 0.1 | 0.2 | 0.0 |

Recognition result
103371

<Second image: character string b2>

| | 6th digit | 5th digit | 4th digit | 3rd digit | 2nd digit | 1st digit |
|---|---|---|---|---|---|---|
| 0 | 0.0 | 0.7 | 0.0 | 0.0 | 0.0 | 0.0 |
| 1 | 0.4 | 0.0 | 0.0 | 0.0 | 0.2 | 0.9 |
| 2 | 0.0 | 0.0 | 0.0 | 0.0 | 0.0 | 0.0 |
| 3 | 0.0 | 0.0 | 0.4 | 0.6 | 0.0 | 0.0 |
| 4 | 0.0 | 0.0 | 0.0 | 0.0 | 0.0 | 0.0 |
| 5 | 0.0 | 0.0 | 0.0 | 0.0 | 0.0 | 0.0 |
| 6 | 0.2 | 0.0 | 0.1 | 0.1 | 0.0 | 0.0 |
| 7 | 0.5 | 0.0 | 0.0 | 0.0 | 0.8 | 0.2 |
| 8 | 0.0 | 0.2 | 0.5 | 0.2 | 0.0 | 0.0 |
| 9 | 0.0 | 0.2 | 0.0 | 0.1 | 0.1 | 0.0 |

Recognition result
708371

FIG. 5

IMAGE PROCESSING APPARATUS, IMAGE PROCESSING METHOD AND COMPUTER-READABLE STORAGE MEDIUM

FIELD

Embodiments described herein relate generally to an image processing apparatus, an image processing method and a computer-readable storage medium.

BACKGROUND

In general, an OCR (optical character recognition) process is executed on a character image acquired by reading a character written on paper by a scanner. In recent years, with an increase in resolution of cameras, an application is available which corrects a character image photographed by a camera, and executes an OCR process on the corrected character image.

Identification determination of an object in a plurality of images photographed at different positions is executed by a trigonometrical survey, if photography positions and photography directions of plural cameras are already known. On the other hand, when photographing an object while moving one camera at an unfixed speed, the photography position and photography direction of the camera are variable. Thus, even if a calculation by a trigonometrical survey is tried, an error becomes larger and it is highly possible that a correct result is not obtained. This being the case, as methods of determining an identical object, there are methods such as a determination method by characteristic point matching, or a determination method based on a unique ID (identification) (e.g. a character string, a bar code, or a numeral string) described on the object.

However, in the method by characteristic point matching, if an object is not characteristic, compared to the surrounding condition, the characteristic point itself cannot be obtained. Furthermore, an attempt to acquire many characteristic points in order to acquire characteristic points of the object leads to erroneous determination or a decrease in processing speed.

On the other hand, in the determination method based on the ID described on the object, the ID has to be photographed with a high resolution. However, if the object is photographed by an ordinary camera from a distant point, the camera cannot photograph the ID with a high resolution. In order to photograph the ID with a high resolution, it is necessary to increase the resolution of the camera or to narrow the view angle. Consequently, the cost will increase and the operability will deteriorate.

Besides, in the OCR process for a character image acquired by a camera, the recognition ratio of characters for a low-resolution character image extremely decreases. Moreover, as regards a low-resolution character image, the recognition ratio of characters tends to vary depending on the quality of images. The quality of images greatly varies due to a slight difference in photography conditions, such as a photography timing of a character image, a photography position, and a photography environment (illumination).

DESCRIPTION OF THE DRAWINGS

FIG. 1 is a schematic view of an image processing apparatus.

FIG. 2 is a block diagram of the image processing apparatus.

FIG. 5 is a view illustrating a plurality of similarity degree maps.

DETAILED DESCRIPTION

Figure 3:
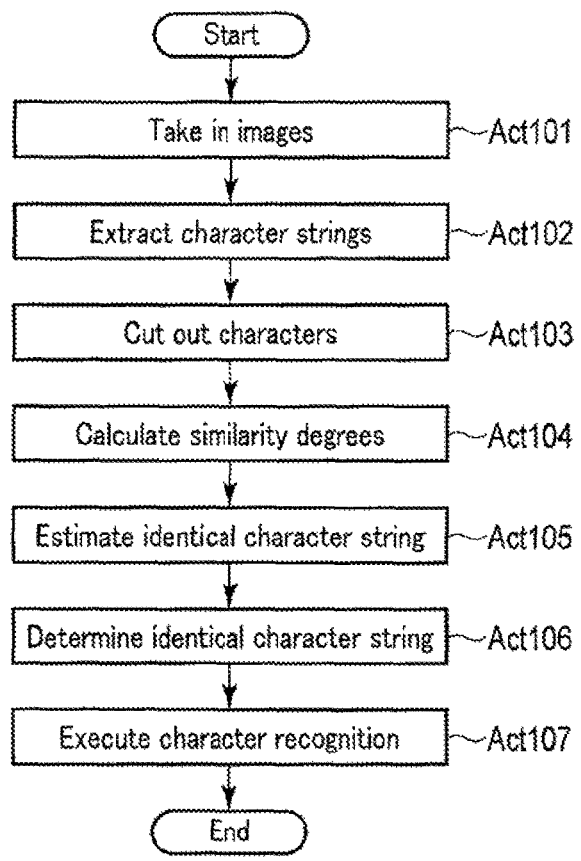
FIG. 3 is a flowchart of a process by the image processing apparatus.

In general, according to one embodiment, an image processing apparatus includes an extraction unit, a cut-out unit, a calculation unit, and a determination unit. The extraction unit is configured to extract a first character string appearing on a first image, and a second character string and a third character string which appear on a second image. The cut-out unit is configured to cut out each of characters constituting the first character string, in units of a character, to cut out each of characters constituting the second character string, in units of a character, and to cut out each of characters constituting the third character string, in units of a character. The calculation unit is configured to calculate a first similarity degree group which is composed of similarity degrees between the respective characters constituting the first character string and respective candidate characters in a candidate character group, to calculate a second similarity degree group which is composed of similarity degrees between the respective characters constituting the second character string and the respective candidate characters in the candidate character group, and to calculate a third similarity degree group which is composed of similarity degrees between the respective characters constituting the third character string and the respective candidate characters in the candidate character group. The determination unit is configured to determine which of the second character string and the third character string corresponds to a first subject which is identical to the first character string, by comparing the first similarity degree group with the second similarity degree group and the third similarity degree group.

Some embodiments will be described hereinafter with reference to the accompanying drawings.

(First Embodiment)

A first embodiment is described. FIG. 1 is a schematic view of an image processing apparatus 10 which is an example according to a first embodiment.

The image processing apparatus 10 is used for inventory management or location management of a plurality of articles (e.g. cardboard boxes) placed on a plurality of shelves in a warehouse or a shop. The image processing apparatus 10 includes a calculator 11, a moving body 12, and a first photography unit 13. The image processing apparatus 10 does not necessarily need to include all of these elements. For example, the image processing apparatus 10 may be an apparatus including at least the calculator 11.

The calculator 11 is an apparatus which executes character recognition from an image by an OCR process, as will be described later. The calculator 11 is, for instance, a PC (Personal Computer). Incidentally, a character is a concept including an identification code, such as a numeral, a symbol, a sign or a mark. A character string is a string in which a plurality of digits of identification codes, such as numerals, symbols, signs or marks, are arranged.

The moving body 12 is a carriage which enables autonomous travel of the image processing apparatus 10 in any direction. The moving body 12 moves in a direction parallel to the direction of extension of linearly arranged shelves 20. The moving body 12 carries the calculator 11 and first photography unit 13.

The first photography unit 13 is a camera which photographs an object. Incidentally, the object is also referred to as a subject in some cases. The first photography unit 13 may be a camera which photographs an object as a moving picture, or may be a camera which photographs an object as a still image. The first photography unit 13 is fixed to the moving body 12 so as to photograph an identical object from different directions. The photography direction of the first photography unit 13 is already known. The object is a character string of a label attached to each of a plurality of articles placed on the shelves 20. For example, "000872" is described on the label of an article 21, and "103371" is described on the label of an article 22. The character string described on the label is ID (identification) information which is uniquely allocated to each article in order to identify the article. In general, the character strings of all labels attached to plural articles, which are managed in a certain area, have the same number of digits, and are combinations of predetermined characters. In the example illustrated in FIG. 1, each character string is composed of six digits and a combination of 0~9 in the respective digits. The first photography unit 13 successively photographs the labels attached to plural articles placed on the shelf 20. The first photography unit 13 sends data of acquired images to the calculator 11.

FIG. 2 is a block diagram of the image processing apparatus 10 which is an example according to the first embodiment. FIG. 2 mainly illustrates the configuration of the calculator 11. The calculator 11 includes a processor 111, a memory 112, an input unit 113, a display 114, and a first interface 115.

The processor 111 corresponds to a central part of the calculator 11. The processor 111 controls the respective elements of the calculator 11 in accordance with an operating system or an application program. The processor 111 includes a take-in unit 1111, an extraction unit 1112, a cut-out unit 1113, a calculation unit 1114, a determination unit 1115 including an estimation unit 1115a and a decision unit 1115b, and a recognition unit 1116. The contents of processes by these elements will be described later.

The memory 112 includes a memory which stores the above-described operating system and application program. The memory 112 further includes a memory serving as a work area that is necessary for processes by the processor 111. Moreover, the memory 112 includes a memory which stores data that is necessary for processes by the processor 111.

The input unit 113 is a keyboard which can input a command to the calculator 11.

The display 114 is a display which displays video, based on a signal from the processor 111. The display 114 is an output unit of video.

The first interface 115 connects the calculator 11 and the first photography unit 13. The calculator 11 takes in data of images from the first photography unit 13 via the first interface 115.

Next, a process of character recognition by the image processing apparatus 10 is described. Images, which the image processing apparatus 10 processes, are, for example, images with low resolutions which the first photography unit 13 captured by photographing the labels attached to plural articles placed on the shelf 20 from far positions. It is thus assumed that the image by the first photography unit 13 enables recognition (reading) of a character string by a person but does not enable adequate character recognition by a general OCR process by the image processing apparatus 10.

FIG. 3 is a flowchart of a process by the image processing apparatus 10 which is an example according to the first embodiment.

The take-in unit 1111 of the processor 111 takes in images (Act 101). In Act 101, the processor 111 takes in data of a first image and a second image, which the first photography unit 13 acquired, via the first interface 115. The first image and second image are images which the first photography unit 13 acquired by photographing a first subject from different directions. The memory 112 stores the data of the first image and the data of the second image. A character string (hereinafter referred to as "first subject"), which is an object of character recognition, appears on the first image and second image. Incidentally, a character string, which is other than the first subject, may appear on the first image and second image.

The extraction unit 1112 of the processor 111 extracts character strings (Act 102). In Act 102, the processor 111 extracts all character strings appearing on the first image. Similarly, the processor 111 extracts all character strings appearing on the second image. In the description below, for the purpose of simplicity, a process on a first character string corresponding to a first subject, which appears on the first image, and a process on a second character string and a third character string, which appear on the second image, are illustrated. The processor 111 extracts the first character string appearing on the first image. Similarly, the processor 111 extracts the second character string and third character string appearing on the second image. The extraction process of character strings in Act 102 may be an arbitrary method used in the OCR process.

The cut-out unit 1113 of the processor 111 cuts out characters (Act 103). In Act 103, the processor 111 cuts out each of the characters which constitute the first character string, in units of a character. Similarly, the processor 111 cuts out each of the characters which constitute the second character string, in units of a character. Likewise, the processor 111 cuts out each of the characters which constitute the third character string, in units of a character. The cut-out process of characters in Act 103 may be an arbitrary method used in the OCR process.

The calculation unit 1114 of the processor 111 calculates a similarity degree (Act 104). In Act 104, the processor 111 calculates a similarity degree between each of the characters constituting the first character string and each of candidate characters in a candidate character group. Thereby, the processor 111 calculates a first similarity degree group which are composed of similarity degrees between the respective characters constituting the first character string and the respective candidate characters in the candidate character group. Specifically, the processor 111 calculates similarity degrees, the number of which corresponds to the number of candidate characters, with respect to each of the digits of the first character string. Similarly, the processor 111 calculates a similarity degree between each of the characters constituting the second character string and each candidate character in the candidate character group. Thereby, the processor 111 calculates a second similarity degree group which are composed of similarity degrees between the respective characters constituting the second character string and the respective candidate characters in the candidate character group. Specifically, the processor 111 calculates similarity degrees, the number of which corresponds to the number of candidate characters, with respect to each of the digits of the second character string. Likewise, the processor 111 calculates a similarity degree between each of the characters constituting the third character string and each candidate character in the candidate character group. Thereby, the processor 111 calculates a third similarity degree group which are composed of similarity degrees between the respective characters constituting the third character string and the respective candidate characters in the candidate character group. Specifically, the processor 111 calculates similarity degrees, the number of which corresponds to the number of candidate characters, with respect to each of the digits of the third character string.

The candidate character group used in the above-described Act 104 is composed of a plurality of candidate characters. The plurality of candidate characters are composed of a plurality of predetermined characters which are usable as a character string for identifying each article. For example, the plural candidate characters are numerals of 0 to 9. The candidate character group is stored in the memory 112. It is possible that the candidate character group varies in accordance with areas where articles are managed. Thus, the memory 112 may store data of candidate character groups which are different between the areas.

The above-described similarity degree calculated in Act 104 is an index indicative of a possibility (probability) that each character constituting the first character string, each character constituting the second character string and each character constituting the third character string agrees with each candidate character. The calculation method of similarity degrees in Act 104 may be an arbitrary method. Incidentally, the range of the similarity degree is not specifically limited. For example, the range of the similarity degree may be 0 to 1, or 0 to 100. The similarity degree, which is closer to the upper limit value, may indicate a higher similarity to the candidate character, and the similarity degree, which is closer to the lower limit value, may indicate a lower similarity to the candidate character. Alternatively, the similarity degree, which is closer to the lower limit value, may indicate a higher similarity to the candidate character, and the similarity degree, which is closer to the higher limit value, may indicate a lower similarity to the candidate character. For example, the processor 111 can calculate each similarity degree such that candidate characters have no relationship of dependency. Specifically, in each digit of the first character string, the respective similarity degrees included in the first similarity degree group have no relationship of dependency. The value of the sum of similarity degrees in each digit of the first character string is not normalized to 100%. The same applies to the similarity degrees in the second character string and third character string. Specifically, in each digit of the second character string, the respective similarity degrees included in the second similarity degree group have no relationship of dependency. Similarly, in each digit of the third character string, the respective similarity degrees included in the third similarity degree group have no relationship of dependency. In this case, when the processor 111 calculates the similarity degree of a certain candidate character in the same digit, the processor 111 is not influenced by the values of similarity degrees of other candidate characters. Therefore, the processor 111 can calculate similarity degrees with high certainty, with the candidate characters being independent from each other.

Conversely, the processor 111 may calculate each similarity degree such that candidate characters have a relationship of dependency. Specifically, in each digit of the first character string, the respective similarity degrees included in the first similarity degree group have a relationship of dependency. The value of the sum of similarity degrees in each digit of the first character string is normalized to 100%. The same applies to the similarity degrees in the second character string and third character string. Specifically, in each digit of the second character string, the respective similarity degrees included in the second similarity degree group have a relationship of dependency. Similarly, in each digit of the third character string, the respective similarity degrees included in the third similarity degree group have a relationship of dependency. In this manner, each similarity degree included in the first similarity degree group, each similarity degree included in the second similarity degree group and each similarity degree included in the third similarity degree group is a likelihood. In this case, the processor 111 can calculate as to with which candidate character the character of each of digits constituting the first character string agrees at a high possibility. Similarly, the processor 111 can calculate as to with which candidate character the character of each of digits constituting the second character string agrees at a high possibility. Likewise, the processor 111 can calculate as to with which candidate character the character of each of digits constituting the third character string agrees at a high possibility.

The estimation unit 1115*a* of the processor 111 estimates an identical character string (Act 105). In Act 105, the processor 111 estimates that it is highly possible that the character string corresponding to an identical subject exists in both the first image and second image.

The decision unit 1115*b* of the processor 111 determines the identical character string (Act 106). In Act 106, the processor 111 can clarify which of the character strings extracted from the first image and which of the character strings extracted from the second image correspond to the identical subject, based on the respective similarity degree groups calculated from the character strings appearing on the first image and the respective similarity degree groups calculated from the character strings appearing on the second image.

In the description below, a description is given of an example in which the processor 111 determines, from the second image, a character string which is the same subject as the first character string of the first image. In the above-described Act 105 and Act 106, the determination unit 1115 of the processor 111 determines which of the second character string and the third character string corresponds to the first subject that is identical to the first character string, by comparing the first similarity degree group with the second similarity degree group and third similarity degree group. A comparison method of respective similarity degree groups by the processor 111 will be illustrated below, but other methods may be adopted.

An example of the comparison method of respective similarity degree groups by the processor 111 is described. The processor 111 calculates a first absolute value group of differences between the similarity degrees included in the first similarity degree group and the similarity degrees included in the second similarity degree group, in units of a corresponding digit between the first character string and the second character string and in units of a candidate character in the candidate character group. Next, the processor 111 calculates a first sum value of the sum of all absolute values in the first absolute value group. Similarly, the processor 111 calculates a second absolute value group of differences between the similarity degrees included in the first similarity degree group and the similarity degrees included in the third similarity degree group, in units of a corresponding digit between the first character string and the third character string and in units of a candidate character in the candidate character group. Next, the processor 111 calculates a second sum value of the sum of all absolute values in the second absolute value group. If the first sum value is smaller than the second sum value, the processor 111 determines that the second character string corresponds to the first subject that is identical to the first character string. Specifically, the processor 111 can determine that the second character string is more similar to the first character string than the third character string, or that the second character string agrees with the first character string. If the second sum value is smaller than the first sum value, the processor 111 determines that the third character string corresponds to the first subject that is identical to the first character string. Specifically, the processor 111 can determine that the third character string is more similar to the first character string than the second character string, or that the third character string agrees with the first character string. By the above, the processor 111 can clarify which character string of the first image and which character string of the second image correspond to the identical subject.

Another example of the comparison method of respective similarity degree groups by the processor 111 is described. The processor 111 calculates a similarity degree between a histogram of the first similarity degree group and a histogram of the second similarity degree group. Similarly, the processor 111 calculates a similarity degree between the histogram of the first similarity degree group and a histogram of the third similarity degree group. If the histogram of the first similarity group is more similar to the histogram of the second similarity group than to the third similarity degree group, the processor 111 determines that the second character string corresponds to the first subject that is identical to the first character string. Specifically, the processor 111 can determine that the second character string is more similar to the first character string than the third character string, or that it is highly possible that the second character string agrees with the first character string. On the other hand, if the histogram of the first similarity group is more similar to the histogram of the third similarity group than to the second similarity degree group, the processor 111 determines that the third character string corresponds to the first subject that is identical to the first character string. Specifically, the processor 111 can determine that the third character string is more similar to the first character string than the second character string, or that it is highly possible that the third character string agrees with the first character string. The processor 111 can calculate a similarity degree between histograms by using, for example, a Bhattacharyya coefficient. Incidentally, the processor 111 may calculate a similarity degree between histograms by other methods.

In the meantime, the process in Act 105 and Act 106 may not be executed after Act 104, but may be executed between Act 102 and Act 103 or between Act 103 and Act 104.

The recognition unit 1116 of the processor 111 executes character recognition (Act 107). In Act 107, the processor 111 recognizes the character string of the first subject by using the first character string corresponding to the first subject and the character string in the second image, which was determined to correspond to the first subject in Act 105 and Act 106. The processor 111 executes an OCR process on the character string appearing on the first image and the character string appearing on the second image, which were determined to correspond to the identical subject, and recognizes the character string of the first subject.

If a recognition result of the character string appearing on the first image and a recognition result of the character string appearing on the second image are different, the processor may finally determine the character string of the first subject by referring to the respective similarity degrees of the first similarity degree group and the respective similarity degrees of the second similarity degree group.

According to the first embodiment, by using the above-described similarity degrees, the image processing apparatus 10 can search a character string corresponding to an identical subject from a plurality of images with low resolutions, and a commodity to which the character string is attached.

Incidentally, if the respective similarity degrees are calculated such that the candidate characters have a relationship of dependency, as described above, the precision of recognition of a character string by the image processing apparatus 10 is further enhanced. The reason for this is that, in each digit of the character string, a candidate character with a highest possibility of agreement is extracted.

Next, a concrete example of the above-described process of character recognition by the image processing apparatus 10 is described with reference to FIG. 4 and FIG. 5.

Figure 4:
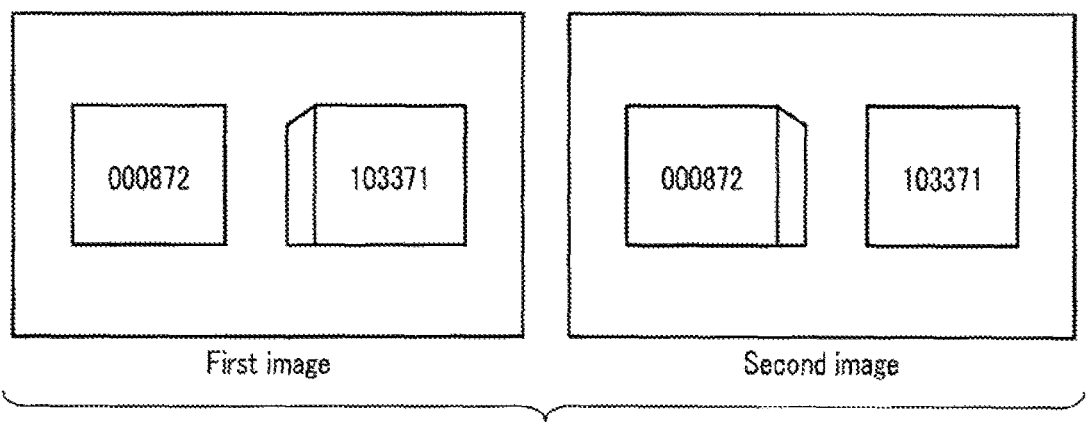
FIG. 4 is a view illustrating a plurality of images.

FIG. 4 is a view illustrating images which are an example according to the first embodiment. A left part and a right part of FIG. 4 illustrate a first image and a second image by the first photography unit 13. The first image and second image are photographed from different positions. A character string "000872" (hereinafter referred to as "subject A") of a label, which is attached to the article 21 that is an object of character recognition, and a character string "103371" (hereinafter referred to as "subject B") of a label, which is attached to the article 22 that is an object of character recognition, appear on the first image and second image. As described above in Act 101, the processor 111 takes in the data of the first image and the data of the second image, which the first photography unit 13 acquired, via the first interface 115.

As described in Act 102, the processor 111 extracts a character string a1 corresponding to the subject A and a character string b1 corresponding to the subject B, the character string a1 and character string b1 appearing on the first image shown in FIG. 4. The processor 111 extracts a character string a2 corresponding to the subject A and a character string b2 corresponding to the subject B, the character string a2 and character string b2 appearing on the second image. As described in Act 103, the processor 111 cuts out, in units of a character, each of the characters constituting the character string a1 and character string b1. Similarly, the processor 111 cuts out, in units of a character, each of the characters constituting the character string a2 and character string b2.

FIG. 5 is a view illustrating a plurality of similarity degree maps, which are an example according to the first embodiment. The similarity degree maps correspond to the above-described first similarity degree group and second similarity degree group. An upper left part of FIG. 5 is a similarity degree map relating to the character string a1. A lower left part of FIG. 5 is a similarity degree map relating to the character string b1. An upper right part of FIG. 5 is a similarity degree map relating to the character string a2. A lower right part of FIG. 5 is a similarity degree map relating to the character string b2. As described in Act 104, the processor 111 calculates a similarity degree between each of the characters constituting the character string a1 and each of the candidate characters in the candidate character group. Thereby, the processor 111 calculates a similarity degree map which is composed of similarity degrees between the respective characters constituting the character string a1 and the respective candidate characters in the candidate character group. Similarly, the processor 111 calculates a similarity degree map relating to the character string b1, a similarity degree map relating to the character string a2, and a similarity degree map relating to the character string b2. The horizontal axis of the similarity degree map indicates the digits of the character string. Incidentally, each of the character string a1, character string b1, character string a2 and character string b2 comprises six digits. The vertical axis indicates candidate characters. The candidate characters comprise ten characters of 0 to 9. Accordingly, each similarity degree map is composed of 60 similarity degrees.

Each similarity degree map shown in FIG. 5 is an example in which the respective similarity degrees were calculated such that the candidate characters have no relationship of dependency in each of the digits, as described above. The similarity degree in FIG. 5 indicates that the similarity to the candidate character is higher as the similarity degree is closer to 1.0, and that the similarity to the candidate character is lower as the similarity degree is closer to 0.0.

A recognition result is indicated below each similarity degree map in FIG. 5. The recognition result is a set of arranged candidate characters which correspond to the maximum values of similarity degrees of the respective digits. As described in Act 105 and Act 106, the processor 111 can determine which of the character string a2 and the character string b2 corresponds to the subject A that is identical to the character string a1, by comparing the similarity degree map relating to the character string a1 with the similarity degree map relating to the character string a2 and the similarity degree map relating to the character string b2. A description is now given of, by way of example, a method using the above-described absolute values of differences between the similarity degrees. The processor 111 calculates, with respect to each corresponding item, the absolute values of differences between the similarity degrees included in the similarity degree map relating to the character string a1 and the similarity degrees included in the similarity degree map relating to the character string a2, and calculates a first sum value of the sum of all absolute values. The first sum value is $|0.9-0.8|+|0.8-0.9|+|0.5-0.4|+|0.0-0.0|+ \ldots +|0.0-0.0|=1.8$. Similarly, the processor 111 calculates, with respect to each corresponding item, the absolute values of differences between the similarity degrees included in the similarity degree map relating to the character string a1 and the similarity degrees included in the similarity degree map relating to the character string b2, and calculates a second sum value of the sum of all absolute values. The second sum value is $|0.9-0.0|+|0.8-0.7|+|0.5-0.0|+|0.0-0.0|+ \ldots +|0.0-0.0|=7.6$. The first sum value is less than the second sum value. Thus, the processor 111 determines that the character string a2 corresponds to the subject A that is identical to the character string a1. Specifically, the processor 111 determines that the character string a2 is more similar to the character string a1 than the character string b2, or that the character string a2 agrees with the character string a1.

Similarly, the processor 111 can determine whether the character string b2 corresponds to the subject B that is identical to the character string b1, by comparing the similarity degree map relating to the character string b1 with the similarity degree map relating to the character string a2 and the similarity degree map relating to the character string b2.

In the meantime, in Act 101, the image processing apparatus 10 may take in three or more images. In this case, the image processing apparatus 10 determines a character string corresponding to an identical subject from the three or more images. The image processing apparatus 10 executes an OCR process on a plurality of character strings which were determined to correspond to the identical subject, and recognizes the character strings, and can determine the character string of this subject, based on a recognition result with a highest frequency of occurrence. Thereby, the image processing apparatus 10 can recognize the character string of the subject with higher precision.

In Act 107, the processor 111 may enhance, by a super-resolution process, the image quality of all images which were determined to correspond to the identical subject, may execute an OCR process on these images, and may determine the character string of this subject. The image processing apparatus 10 can recognize the character string of the subject with higher precision.

In Act 107, the processor 111 may estimate a position at which the first subject appears on the second image, based on an amount of movement between the first image and the second image, and may determine that the second character string does not correspond to the first subject if the second character string is far from this position by a predetermined distance or more. Similarly, the processor 111 may determine that the third character string does not correspond to the first subject if the third character string is far from this position by a predetermined distance or more. The amount of movement between the first image and the second image may be based on, for example, an amount of movement of the moving body 12 or the first photography unit 13 mounted on the moving body 12, or may be based on an amount of movement of an arbitrary mark appearing on the first image and second image. In addition, also when the shape of the second character string is greatly different from the shape of the first character string or when the shape of an article, to which the second character string is attached, is greatly different from the shape of an article to which the first character string is attached, the processor 111 may determine that the second character string does not correspond to the first subject. Similarly, also when the shape of the third character string is greatly different from the shape of the first character string or when the shape of an article, to which the third character string is attached, is greatly different from the shape of an article to which the first character string is attached, the processor 111 may determine that the third character string does not correspond to the first subject. Thereby, the image processing apparatus 10 can recognize the character string of the subject with higher precision.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on an apparatus and the apparatus can be an entity. One or more entities can reside within a process and/or thread of execution and a entity can be localized on one apparatus and/or distributed between two or more apparatuses.

The program for realizing the functions can be recorded in the apparatus, can be downloaded through a network to the apparatus and can be installed in the apparatus from a computer readable storage medium storing the program therein. A form of the computer readable storage medium can be any form as long as the computer readable storage medium can store programs and is readable by the apparatus such as a disk type ROM and a Solid-state computer storage media. The functions obtained by installation or download in advance in this way can be realized in cooperation with an OS (Operating System) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
   an interface configured to receive, from an external apparatus, a first image and a second image, wherein the first image is different from the second image; and
   a processor configured to:
      extract a first character string appearing on the first image, and a second character string and a third character string appearing on the second image,
      cut out each of characters constituting the first character string, in units of a character,
      cut out each of characters constituting the second character string, in units of a character, and cutting out each of characters constituting the third character string, in units of a character,
      calculate a first similarity degree group which is composed of similarity degrees between the respective characters constituting the first character string and respective candidate characters in a candidate character group,
      calculate a second similarity degree group which is composed of similarity degrees between the respective characters constituting the second character string and the respective candidate characters in the candidate character group,
      calculate a third similarity degree group which is composed of similarity degrees between the respective characters constituting the third character string and the respective candidate characters in the candidate character group, and
      determine which of the second character string and the third character string corresponds to a first subject which is identical to the first character string, by comparing the first similarity degree group with the second similarity degree group and the third similarity degree group.

2. The image processing apparatus of claim 1, wherein the processor is further configured to:
   calculate a first absolute value group of differences between the similarity degrees included in the first similarity degree group and the similarity degrees included in the second similarity degree group, in units of a corresponding digit between the first character string and the second character string and in units of a candidate character in the candidate character group,
   calculate a first sum value of a sum of all absolute values in the first absolute value group,
   calculate a second absolute value group of differences between the similarity degrees included in the first similarity degree group and the similarity degrees included in the third similarity degree group, in units of a corresponding digit between the first character string and the third character string and in units of a candidate character in the candidate character group,
   calculate a second sum value of a sum of all absolute values in the second absolute value group,
   determine that the second character string corresponds to the first subject which is identical to the first character string if the first sum value is smaller than the second sum value, and
   determine that the third character string corresponds to the first subject which is identical to the first character string if the second sum value is smaller than the first sum value.

3. The image processing apparatus of claim 1, wherein the processor is further configured to:
   calculate a similarity degree between a histogram of the first similarity degree group and a histogram of the second similarity degree group,
   calculate a similarity degree between the histogram of the first similarity degree group and a histogram of the third similarity degree group,
   determine that the second character string corresponds to the first subject which is identical to the first character string if the histogram of the first similarity group is more similar to the histogram of the second similarity group than to the third similarity degree group, and
   determine that the third character string corresponds to the first subject which is identical to the first character string if the histogram of the first similarity group is more similar to the histogram of the third similarity group than to the second similarity degree group.

4. The image processing apparatus of claim 1, wherein the processor is further configured to:
   estimate a position at which the first subject appears on the second image, based on an amount of movement between the first image and the second image,
   determine that the second character string does not correspond to the first subject if the second character string is far from the position by a predetermined distance or more, and
   determine that the third character string does not correspond to the first subject if the third character string is far from the position by a predetermined distance or more.

5. The image processing apparatus of claim 1, wherein the processor is further configured to:
   recognize a character string of the first subject by using the first character string, and the character string in the second image, which was determined to correspond to the first subject by the processor.

6. The image processing apparatus of claim 1, wherein each of the similarity degrees included in the first similarity degree group, each of the similarity degrees included in the second similarity degree group and each of the similarity degrees included in the third similarity degree group is a likelihood.

7. The image processing apparatus of claim 1, wherein the first character string and the second character string are allocated to articles.

8. An image processing method comprising:
   extracting a first character string appearing on a first image received from an external apparatus;
   extracting a second character string and a third character string which appear on a second image received from the external apparatus, wherein the first image is different from the second image;
   cutting out each of characters constituting the first character string, in units of a character;
   cutting out each of characters constituting the second character string, in units of a character;
   cutting out each of characters constituting the third character string, in units of a character;

calculating a first similarity degree group which is composed of similarity degrees between the respective characters constituting the first character string and respective candidate characters in a candidate character group;

calculating a second similarity degree group which is composed of similarity degrees between the respective characters constituting the second character string and the respective candidate characters in the candidate character group;

calculating a third similarity degree group which is composed of similarity degrees between the respective characters constituting the third character string and the respective candidate characters in the candidate character group; and determining which of the second character string and the third character string corresponds to a first subject which is identical to the first character string, by comparing the first similarity degree group with the second similarity degree group and the third similarity degree group.

9. A computer-readable, non-transitory storage medium having stored thereon a program which is executable by a computer, the program controlling the computer to execute functions of:

extracting a first character string appearing on a first image from an external apparatus;

extracting a second character string and a third character string which appear on a second image from the external apparatus, wherein the first image is different from the second image;

cutting out each of characters constituting the first character string, in units of a character;

cutting out each of characters constituting the second character string, in units of a character;

cutting out each of characters constituting the third character string, in units of a character;

calculating a first similarity degree group which is composed of similarity degrees between the respective characters constituting the first character string and respective candidate characters in a candidate character group;

calculating a second similarity degree group which is composed of similarity degrees between the respective characters constituting the second character string and the respective candidate characters in the candidate character group;

calculating a third similarity degree group which is composed of similarity degrees between the respective characters constituting the third character string and the respective candidate characters in the candidate character group; and determining which of the second character string and the third character string corresponds to a first subject which is identical to the first character string, by comparing the first similarity degree group with the second similarity degree group and the third similarity degree group.

* * * * *